US012259113B2

(12) United States Patent
Osur et al.

(10) Patent No.: US 12,259,113 B2
(45) Date of Patent: Mar. 25, 2025

(54) LIGHT FIXTURE FOR LOW PROFILE INSTALLATION

(71) Applicant: Coronet Inc., Totowa, NJ (US)

(72) Inventors: Russell Osur, Totowa, NJ (US); Tyler Mark, Totowa, NJ (US)

(73) Assignee: Coronet Inc., Totowa, NJ (US)

( * ) Notice: Subject to any disclaimer, the term of this patent is extended or adjusted under 35 U.S.C. 154(b) by 0 days.

(21) Appl. No.: 18/491,783

(22) Filed: Oct. 22, 2023

(65) Prior Publication Data

US 2024/0133540 A1 Apr. 25, 2024
US 2024/0230067 A9 Jul. 11, 2024

Related U.S. Application Data

(60) Provisional application No. 63/418,498, filed on Oct. 22, 2022.

(51) Int. Cl.

| | |
|---|---|
| ***F21V 21/03*** | (2006.01) |
| ***F21S 8/06*** | (2006.01) |
| ***F21V 17/06*** | (2006.01) |
| ***F21V 17/08*** | (2006.01) |
| ***F21Y 115/10*** | (2016.01) |

(52) U.S. Cl.

CPC .............. *F21V 21/03* (2013.01); *F21S 8/061* (2013.01); *F21V 17/06* (2013.01); *F21V 17/08* (2013.01); *F21Y 2115/10* (2016.08)

(58) Field of Classification Search

CPC .......... F21V 21/03; F21V 17/06; F21V 17/08; F21V 17/10; F21V 21/048; F21S 8/061; F21S 8/043; F21S 8/026; F21Y 2115/10; F21Y 2103/10; E04B 9/067; E04B 9/241; E04B 9/006

See application file for complete search history.

(56) References Cited

U.S. PATENT DOCUMENTS 4,086,480 A * 4/1978 Lahm ...................... F21V 21/04 362/225
5,345,729 A * 9/1994 Prahst ..................... F21V 21/04 52/28
7,278,775 B2 10/2007 Yeo et al.
7,542,635 B2 6/2009 Coleman
(Continued)

FOREIGN PATENT DOCUMENTS

CA 2702600 C 4/2013

*Primary Examiner* — Zheng Song
*Assistant Examiner* — Glenn D Zimmerman
(74) *Attorney, Agent, or Firm* — Maginot, Moore & Beck LLP

(57) ABSTRACT

An LED light fixture assembly includes an LED light housing and an installation bracket. The LED light housing has a first side configured to convey light from an interior of the light housing to an exterior of the light housing. The first side defines a bottom side of the LED light housing when installed in a ceiling, and has a first width. The installation bracket is coupled to the LED light housing, and includes a first arm and a second arm. The first arm includes at least a portion flaring out from and extending downward from a first location of the LED light housing. The first arm is elastically deformable to facilitate insertion into an opening having a width that is less than a width between a first point on the first arm and a second point on the second arm on a same horizontal plane.

20 Claims, 6 Drawing Sheets

(56) References Cited

U.S. PATENT DOCUMENTS

| | | | | |
|---|---|---|---|---|
| 7,722,224 | B1 | 5/2010 | Coleman et al. | |
| 10,852,466 | B2 | 12/2020 | Yeo et al. | |
| 10,865,952 | B1 * | 12/2020 | Rao | F21S 8/031 |
| 10,995,939 | B2 | 5/2021 | James et al. | |
| 11,022,260 | B2 * | 6/2021 | Chen | F21V 17/16 |
| 11,156,762 | B2 | 10/2021 | Yeo et al. | |
| 11,163,104 | B2 | 11/2021 | Yeo et al. | |
| 2010/0254146 | A1 * | 10/2010 | McCanless | F21S 4/28 362/373 |
| 2011/0310604 | A1 * | 12/2011 | Shimizu | F21K 9/66 362/249.02 |
| 2016/0102825 | A1 * | 4/2016 | Scribante | F21V 21/047 362/217.14 |
| 2018/0172898 | A1 * | 6/2018 | Blessitt | G02B 6/0091 |
| 2018/0188018 | A1 * | 7/2018 | Brown | G01C 3/08 |
| 2019/0104585 | A1 * | 4/2019 | Albrechtsen | F21V 23/007 |
| 2019/0145611 | A1 * | 5/2019 | May | F21S 8/043 362/147 |
| 2019/0234590 | A1 * | 8/2019 | Béland | F21V 21/005 |
| 2020/0200379 | A1 * | 6/2020 | Ryder | F21V 23/009 |
| 2021/0254815 | A1 | 8/2021 | James et al. | |
| 2021/0405281 | A1 | 12/2021 | Yeo et al. | |

* cited by examiner

LIGHT FIXTURE FOR LOW PROFILE INSTALLATION

This application claims the benefit of U.S. Provisional Patent Application Ser. No. 63/418,498, filed Oct. 22, 2022, which is incorporated herein by reference in its entirety.

FIELD OF THE INVENTION

The present invention relates generally to lighting fixtures, and more specifically, to ceiling lighting fixtures.

BACKGROUND

Lighting fixtures for commercial, industrial, accent and home use often install directly in the ceiling of a room or space of a building. LED lighting fixtures have gained popularity in many applications due to the efficiency of LED lighting, and the flexibility in lighting fixture design. An LED lighting fixture typically include a fixture frame that supports LED lights, electrical circuits that provide power to the LED lights, and a lens through which light from the fixture can illuminate a space.

The lens of the ceiling lighting fixture typically faces downward into the room. Typically, the fixture frame includes means for connecting the lighting fixture at least partially within the plenum. Installation of ceiling lighting fixtures typically require access to the plenum, such that appropriate electrical and physical connections may be made.

In many cases, ceiling lighting fixtures can be installed in a ceiling grid. A ceiling grid is a collection of braces called main tees and cross tees that are suspended from the building structure in the plenum. Main tees and cross tees are generally flat plastic or metal beams having bottom shelves or flanges that extend perpendicular to the ceiling plate. The bottom shelves or flanges may comprise a thin flat structure, forming an inverted T-shape with the main beam, or comprise a slotted structure, both of which are known in the art. In general, the ceiling grid is designed such that standard square or rectangular ceiling tiles are supported on four sides by the flanges of two cross tees and two main tees. An array of such ceiling tiles on the cross tees and main tees of the grid make up the ceiling of the space.

Lighting fixtures may also be installed between ceiling tiles. In some cases, light fixtures may be installed on cross tees such that the optical lens is flush or nearly flush with the surrounding ceiling tiles and ceiling grid. To install light fixtures, the light fixture housing is typically installed from above, and include flanges or receptacles that engage and rest on parts of the cross tees. Some light fixture housings rest on the top of the main beam, and others engage the flange or shelf. In addition, or in the alternative, the light fixture may be suspended in place via tie lines that are coupled to the structures in the plenum.

One difficulty encountered with installing light fixtures is when the plenum has little room for manipulation of the light fixture, either due to the shallowness of the plenum, or due to interference from other structures in the plenum, such as plumbing structures or electrical cable conduits.

Accordingly, there is a need for a method and apparatus for installing light fixtures in a plenum with reduced space for manipulating the light fixture above the ceiling grid.

SUMMARY

The embodiments disclosed herein address the above-referenced need, as well as others, by providing a snap-in light fixture with a low vertical profile.

A first embodiment is an LED light fixture assembly having an LED light housing and at least one installation bracket. The LED light housing has a first side configured to convey light from an interior of the light housing to an exterior of the light housing. The first side has a first width in a first plane, and defines a bottom side of the LED light housing when installed in a ceiling. The installation bracket is coupled to a second side of the housing. The installation bracket includes a first arm extending from adjacent the second side downward and outward from the LED light housing, and a second arm extending from adjacent the second side downward and outward from the second side. A distance between a first point on the first arm intersecting a second plane that is parallel to the first plane and a second point on the second arm intersecting the second plane is greater than the first width.

A second embodiment is an LED light fixture assembly that includes an LED light housing and an installation bracket. The LED light housing has a first side configured to convey light from an interior of the light housing to an exterior of the light housing. The first side defines a bottom side of the LED light housing when installed in a ceiling, and has a first width. The installation bracket is coupled to the LED light housing, and includes a first arm and a second arm. The first arm includes at least a portion flaring out from and extending downward from a first location of the LED light housing. The first arm is elastically deformable to facilitate insertion into an opening having a width that is less than a width between a first point on the first arm and a second point on the second arm on a same horizontal plane.

The above-described features and advantages, as well as others, will become more readily apparent to those of ordinary skill in the art by reference to the following detailed description and accompanying drawings.

DETAILED DESCRIPTION

Figure 1:
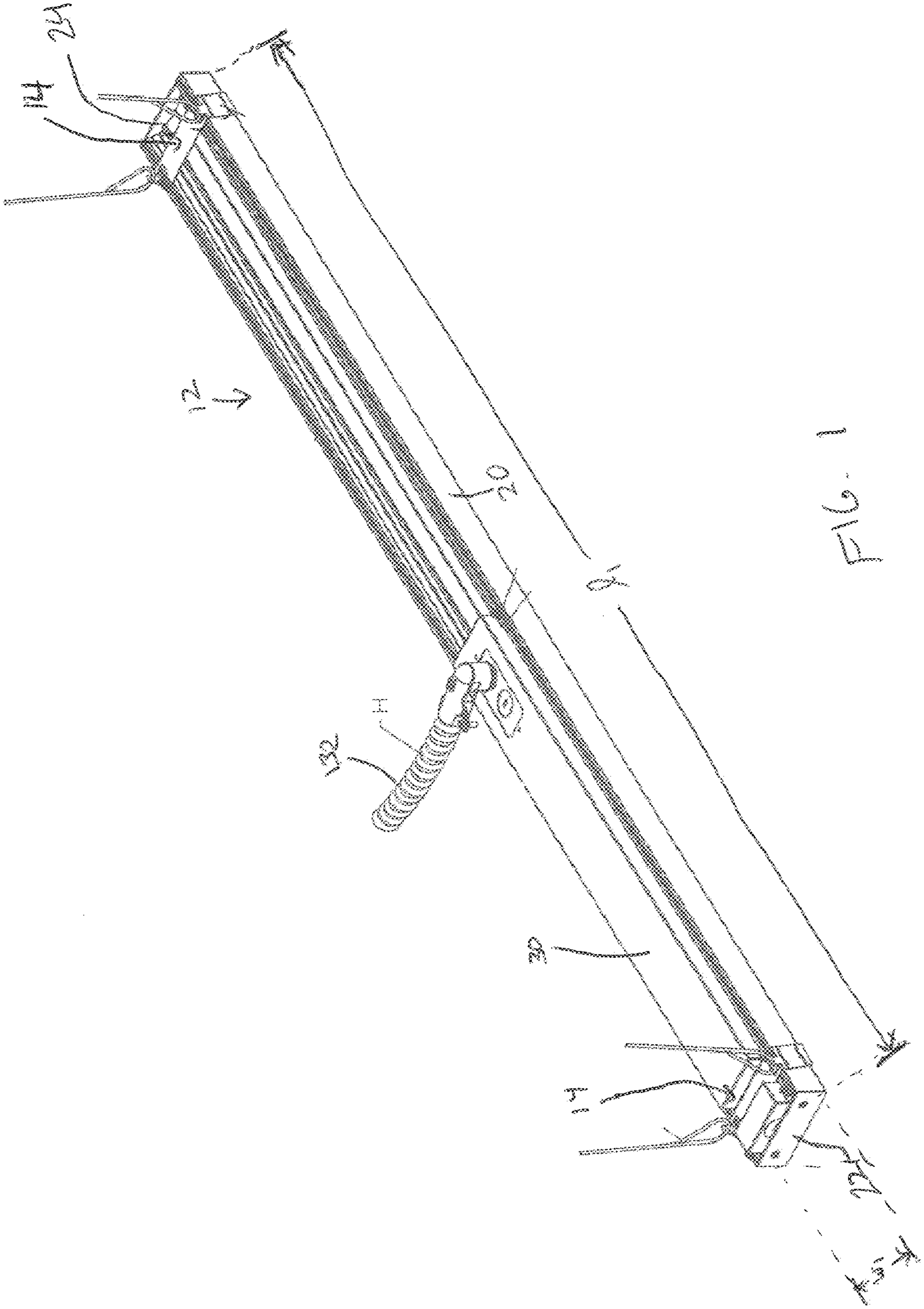
FIG. 1 shows a top perspective view of an exemplary LED light fixture assembly according to a first embodiment.
Figure 1A:
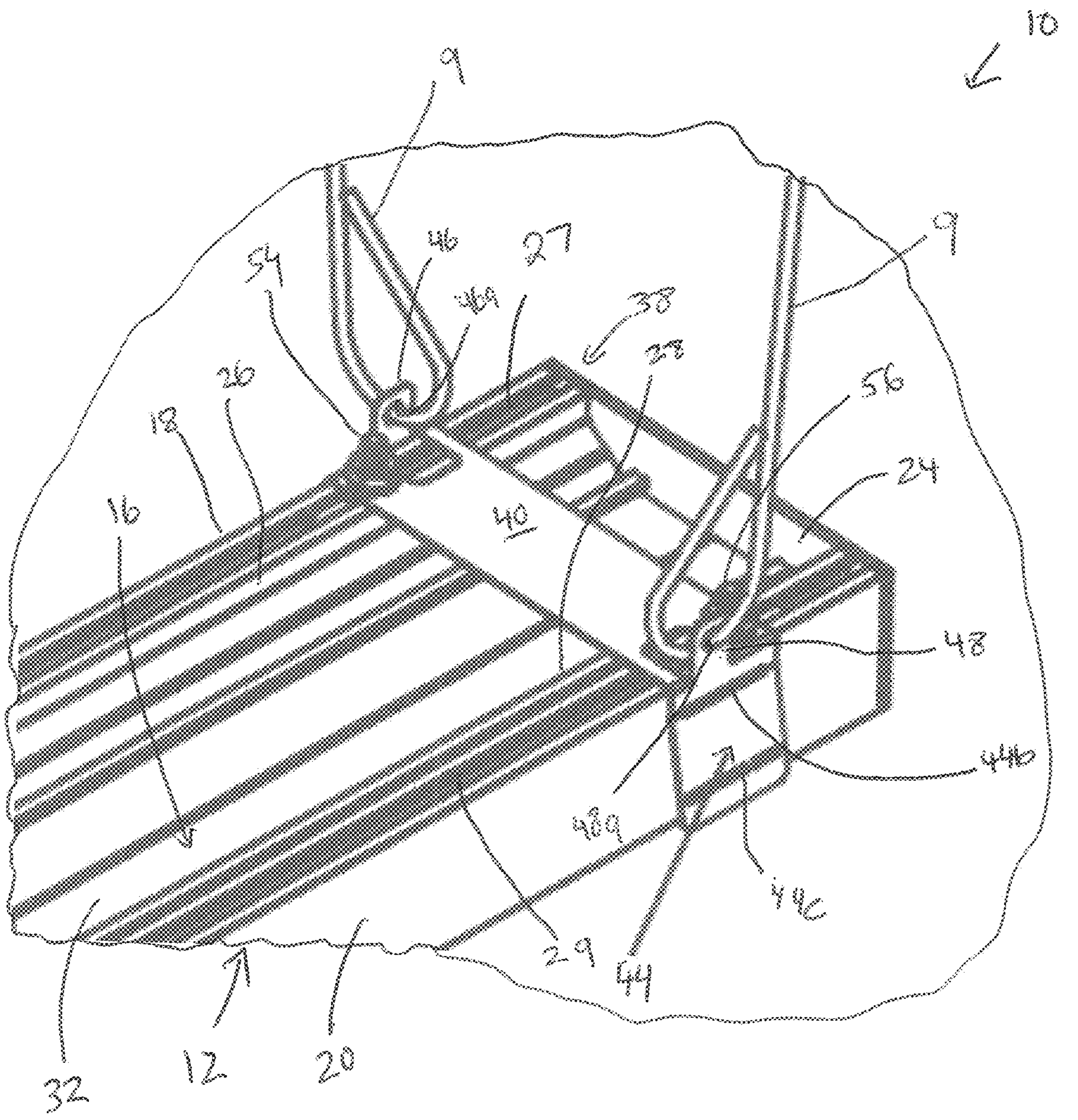
FIG. 1A shows a fragmentary perspective view of the LED light fixture assembly that is an enlarged portion of FIG. 1.
Figure 2:
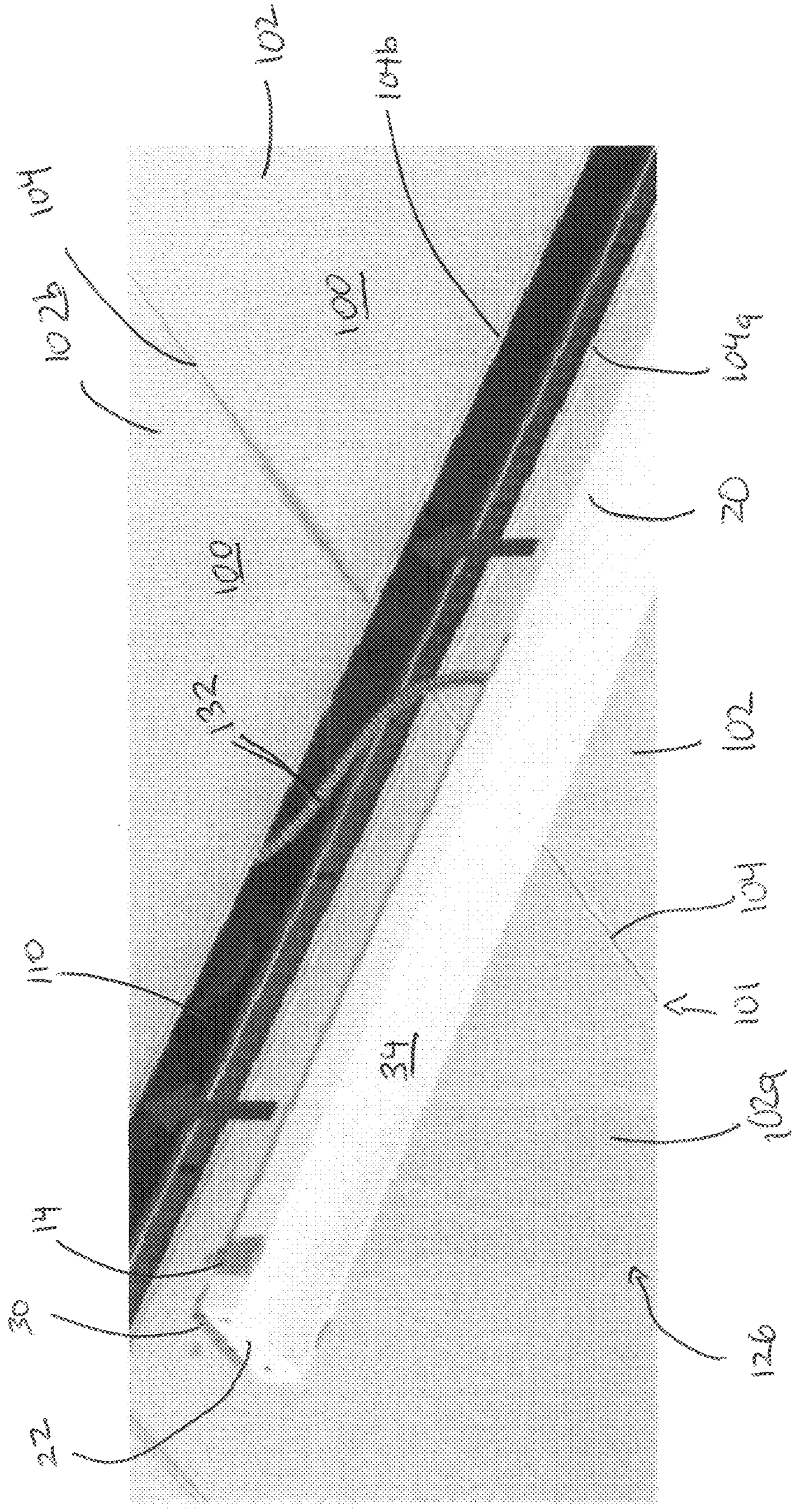
FIG. 2 shows a bottom perspective fragmentary view of the LED light fixture assembly of FIG. 1 being installed into a ceiling plenum.
Figure 3A:
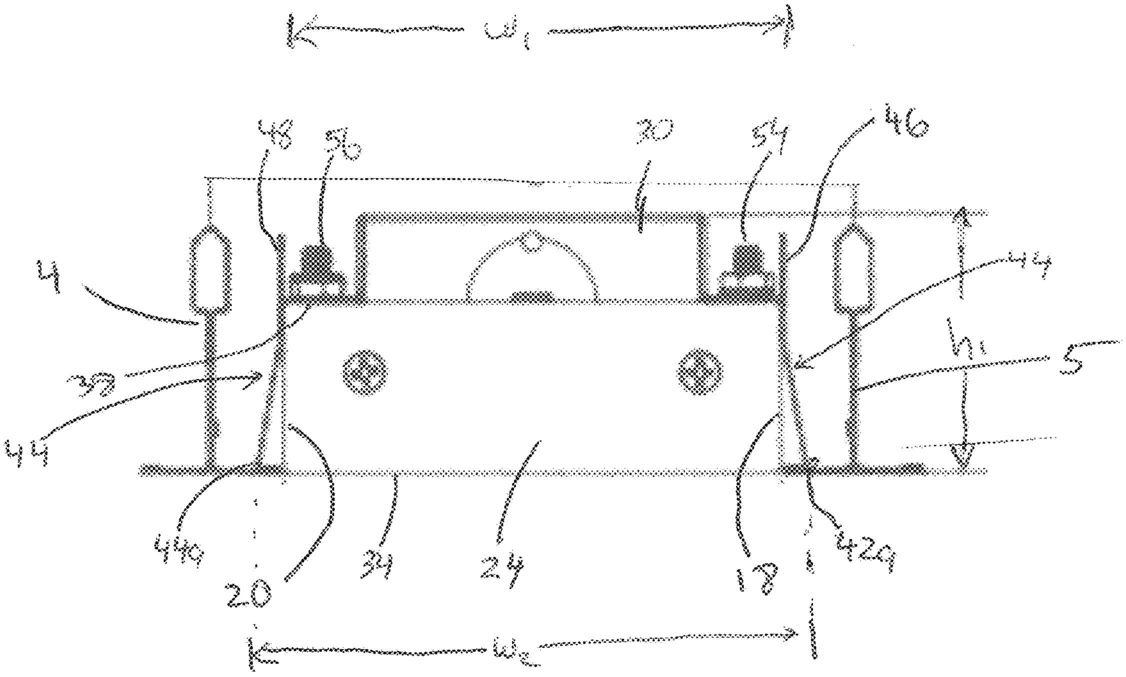
FIG. 3A shows an end plan view of the LED light fixture assembly of FIG. 1 installed in a tee grid.
Figure 3B:
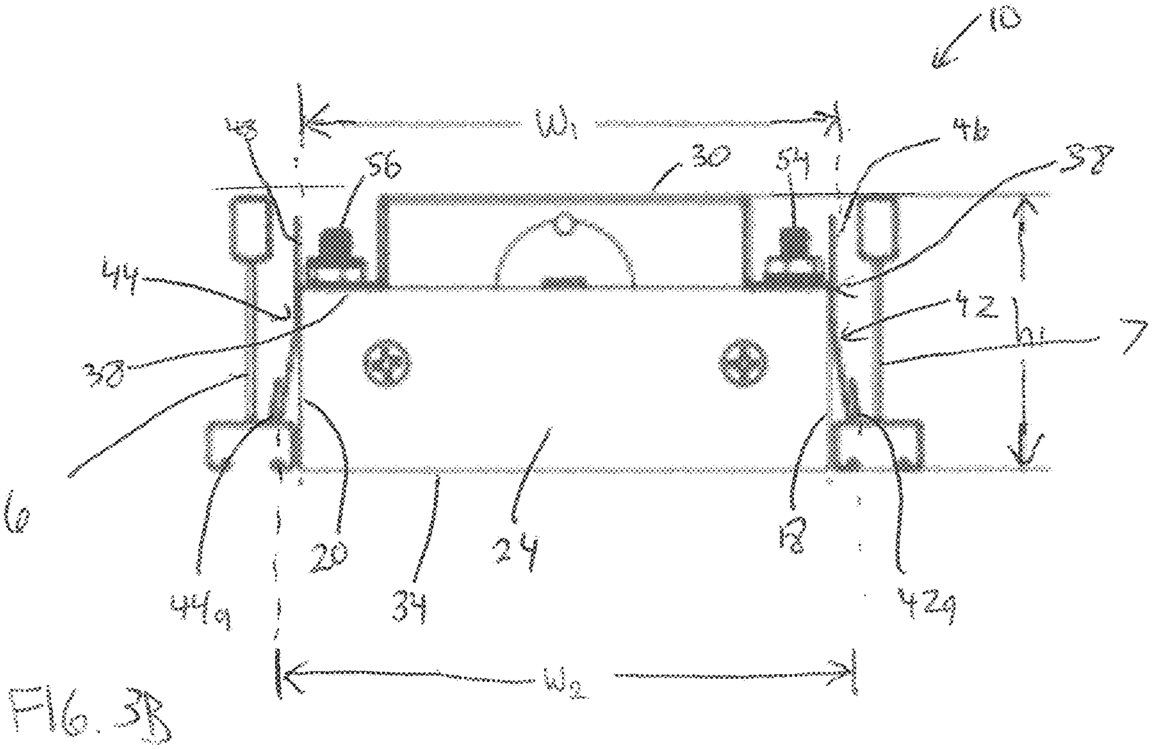
FIG. 3B shows an end plan view of the LED light fixture assembly of FIG. 1 installed in a slot grid.

FIG. 1 shows a top perspective view of an LED light fixture assembly 10 according to a first embodiment. FIG. 1A shows a fragmentary perspective view of the LED light fixture assembly 10 that is an enlarged portion of FIG. 1. FIG. 2 shows a bottom perspective fragmentary view of the LED light fixture assembly 10 being installed into a ceiling plenum. FIG. 3A shows an end plan view of the LED light fixture assembly 10 installed onto structures of ceiling having a tee-grid 4, 5. FIG. 3B shows an end plan view of the LED light fixture assembly 10 installed onto structures of a ceiling having a slot-grid 6, 7.

With contemporaneous reference to FIGS. 1, 2, 3A, and 3B, the LED light fixture assembly 10 includes a light housing 12 and two installation brackets 14. The light housing 12 in the form of a tray-like structure having a bottom housing 16, side walls 18, 20, end walls 22, 24, inner walls 26, 28 and a driver housing box 30. The bottom housing 16 includes a top plate 32, which forms the bottom of the tray-like structure, and a bottom lens 34 below the top plate 32, which is the portion visible from the space in which the fixture 10 is installed (see FIG. 2). The bottom housing 16 includes an array or collection of LED lights, not shown, disposed between the top plate 32 and the bottom lens 34. However, it will be appreciated that the form of light or the precise arrangement of the housing for the light may differ in other embodiments. In any event, the bottom lens 34 is configured to convey light from an interior of the bottom housing 16 to the exterior of the light housing 12.

The driver housing box 30 contains the electrical circuitry, not shown, that drives or power the array of LED lights disposed in or on the bottom housing 16. Suitable driver electrical circuitry and corresponding LED light arrays would be known to those of ordinary skill in the art. In other embodiments, the bottom housing 16 may be replaced with a structure that supports fluorescent bulbs, or other types of light emitting structures.

The lens 34 in this embodiment is a plate of translucent and/or transparent polymer or glass, and forms the bottom side 36 of the light housing 12. However, it will be appreciated that in other embodiments, the bottom side 36 may include framing pieces or elements external to the lens 34. In either event the bottom side 36, has width $w_1$ and length $l_1$, which generally is intended to coincide with the opening in the ceiling, not shown in FIGS. 1 to 3B, in which it is to be installed. As mentioned above, the top plate 32 of the bottom housing 16, the side walls 18, 20, and the end walls 22, 24 define a tray-like structure having generally the same length $l_1$ and width $w_1$. (See FIGS. 1, 3A, 3B). The side walls 18, 20 have substantially the length $l_1$ and a height $h_1$. (See FIGS. 1, 3A, 3B). The end walls 22, 24 have a length equal to the width $w_1$ and the height that is less than the $h_1$. (See FIG. 3A, 3B). In this embodiment, the driver housing box 30 extends out of the light housing 12 and defines the upper most extremity of the fixture 10.

Referring specifically to FIGS. 1 and 1A, the inner walls 26, 28 generally co-extend adjacent to and parallel to respective side walls 18, 20, and extend from the top plate 32 of the bottom housing 16 to the top of the side walls 18, 20. The inner wall 26 is spaced apart from the side wall 18 to form a slot 27 which can receive a threaded fastener. Similarly, the inner wall 28 is spaced apart from the side wall 20 to form a corresponding slot 29. The tops of the side walls 18, 20 and inner walls 26, 28 generally form to the top side 38 of the housing 12 in this embodiment. The driver housing box 30 is disposed within an interior formed by the inner walls 26, 28 and the end walls 22, 24, and may have approximately half the length ii. The driver housing box 30 in this embodiment extends above the tops of the side walls 18, 20 and inner walls 26, 28.

It will be appreciated that the values of $l_1$ and $w_1$ may vary to provide for different size lighting fixtures. In this embodiment, the length $l_1$ may suitably be 12 to 48 inches, but may be more. The width $w_1$ may be anywhere from 3 inches to 12 inches or more. In this disclosure, terms of direction (up, down, top, bottom) are referenced with regard to an installation of the light fixture 12 in a ceiling of a building or space with the lens 34 facing downward into the room or space.

Figure 4:
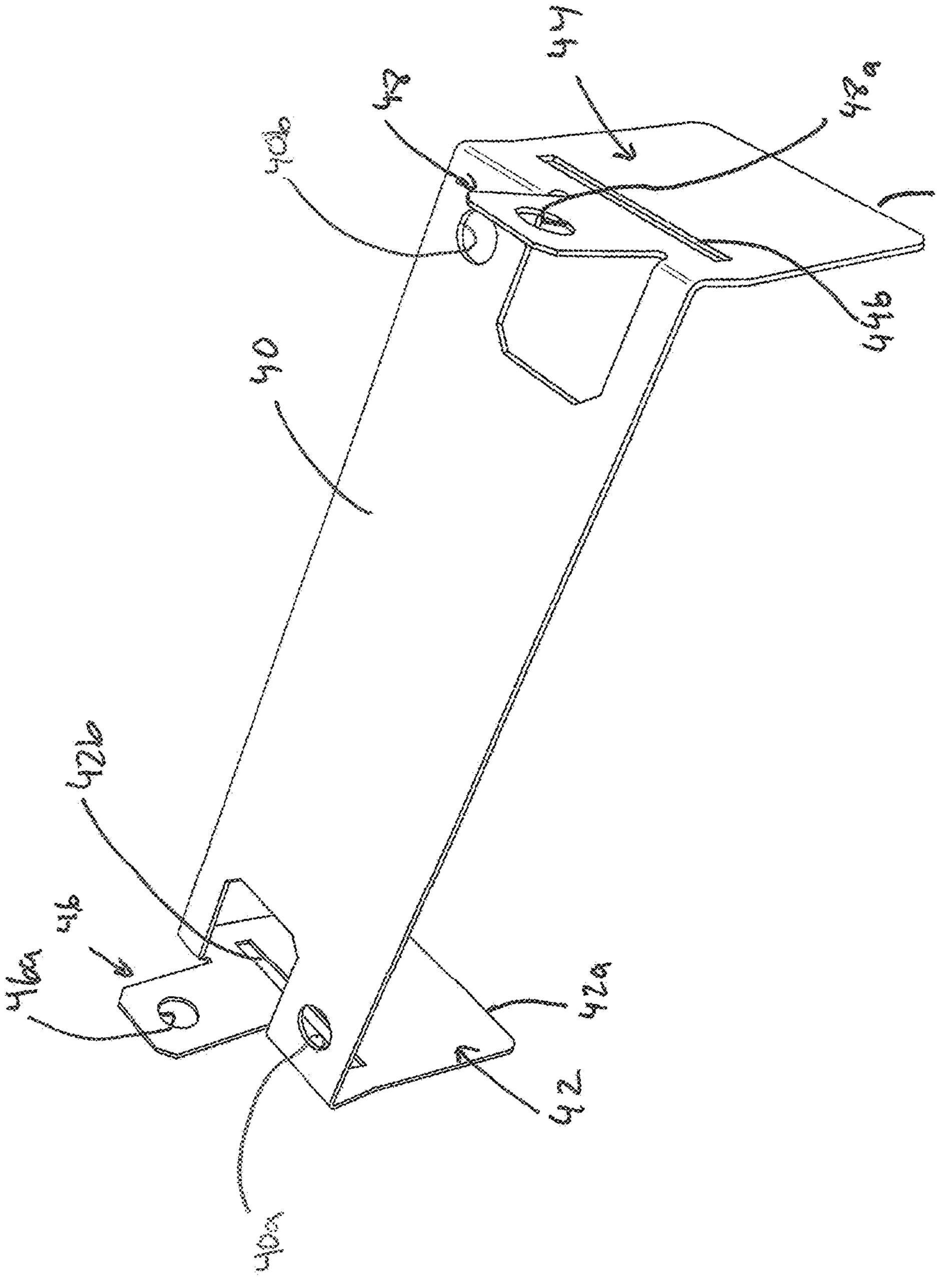
FIG. 4 shows a perspective view of an embodiment of an installation bracket that can be used in the LED light fixture assembly of FIG. 1.

FIG. 4 shows a perspective view of an installation bracket 14 of LED light fixture assembly 10. With particular reference to FIGS. 1A, 3A, 3B, and 4, each installation bracket 14 in this embodiment includes a cross plate 40, a first arm 42, a second arm 44, a first tab 46, and a second tab 48. The cross plate 40 is relatively flat metal (or alternatively polymer) plate that is configured to extend over the top side 38 of the light housing 12. The cross plate 40 includes two openings 40*a*, 40*b* configured to receive fasteners, and which are disposed at opposite ends of the cross plate 40 at a distance designed to align with the gaps 27, 29, respectively, of the top side 38 of the light housing 12. In this embodiment, the cross plate 40 is coupled to the top side 38 via fasteners 54, 56. In particular, the fastener 54, which may suitably be a bolt-and-nut, extends through the opening 40*a* and fastens to the housing 12 within the gap 27 between the inner side wall 26 and the outer side wall 18. Similarly, the fastener 56, which may also suitably be a bolt-and-nut, extends through the opening 40*b* and fastens to the housing 12 within the gap 29 between the inner side wall 28 and the outer side wall 20.

The first arm 42 extends from one end of the cross plate 40 adjacent the top side 38 second side downward and outward from side wall 18 to a lowest point 42*a*. Similarly, the second arm 44 extends from the other end of the cross plate 40 adjacent the top side 38 downward and outward from the second side wall 20 to a lowest point 44*a*. The distance between the points 42*a* and 44*a* exceeds the width $w_1$, and wider than the opening in the ceiling, not shown in FIGS. 1 to 3B, in which the light housing 12 is intended to be installed.

In other words, the first arm 42 and second arm 44 flare out away from each other as they extend down along the sides 18, 20, respectively, of the light housing 12. The flare out need not be constant. At least some advantages can be achieved if a distance between a first point, such as point 42*a* or other point on the first arm 42 intersecting a horizontal plane that is parallel to and lower than a plane defined by the bottom lens 34 of the housing 12, and a second point on the second arm 44 on the horizontal plane, is greater than the first width.

The first arm 42 and the second arm 44 may suitably be integrally formed with the cross plate 40, such as by using a single sheet of metal that is formed with bends to form the first arm 42 and the second arm 44. However, it will be appreciated that the installation bracket 14 may take other forms where the first arm 42 and the second arm 44 flare outward and downward from the top side 38 of the housing 12. As a result the horizontal distance $w_2$ between the lowest points 42*a*, 44*a* of the respective arms is greater than the width $w_1$ of the bottom lens 34. In this embodiment, the cross plate 40 extends in a substantially planar manner from the top of the first arm 42 to the top of the second arm 44.

The first arm 42 and the second arm 44 are further configured (with the cross plate 40 or other structure of the installation bracket 14) to have spring action flexibility that allows them to be temporary compressed inward toward, and preferably against, the respective side walls 18, 20. As will be discussed further below in detail, this spring action allows for the light housing 12 to be inserted into an opening of a ceiling that is narrower than the nominal distance $w_2$ between the lowermost points 42*a*, 44*a* of the respective first and second arms 42, 44.

As shown in FIGS. 1A and 4, the second arms 44 in in this embodiment further includes a cut-out 44*b* formed near the top of the second arm 44, proximate to, but slightly below, the top side 38 of the housing 12. The cut-out 44*b* is configured to provide reduced stiffness to allow for the inward flex of the second arm 44 during insertion into the ceiling. The first arm 42 includes an identical cut-out 42*b* in the corresponding location of the first arm 42, as shown in FIG. 4. FIG. 1A further shows an optional additional cut-out 44*c* located lower on the first arm 44 than the cut-out 44*b*. The arm 42 would also have the additional cut-out. The lower cut-out 44*c* provides a reduce stiffness that allows for configuring or bending the arm 44 to accommodate different grid types, such as those shown in FIGS. 3A and 3B. While FIG. 3A shows the arms 42, 44 fully extended to accommodate tee grid braces 4, 5, FIG. 3B shows the arms 42, 44 bent under to accommodate the shortened space provided by the slot grid braces 6, 7.

Referring to the embodiment of FIG. 4, the first tab 46 extends upward from the cross plate 40, preferably adjacent to the top of the first side wall 18. The first tab 46 includes a throughhole 46*a* that is sized and configured to receive a tie wire 9, not shown in FIGS. 1 to 3. The second tab 48 similarly has a throughhole 48*a*, and extends upward from the cross plate 40, preferably adjacent to the top of the second side wall 20. In this embodiment, each of the tabs 46, 48 is formed from a square piece of the plate the forms the cross plate 40 that has been punched out on three sides, and bent upwards.

It will be appreciated that the length of the arms 42, 44 is chosen to correspond to the ceiling grid and the intended vertical position of the lens 34. As will be discussed below in connection with FIGS. 2, 5 and 6 the length of the arms 42, 44 is preferably such that when the arms engage an upper surface of an adjacent cross tees or main tees, the bottom lens 34 is flush with the bottom surface of the cross tees and/or main tees. As discussed above, the arms 42, 44 may have an additional cut-out slot 44*c* to facilitate bending to adjust their vertical length.

Figure 5:
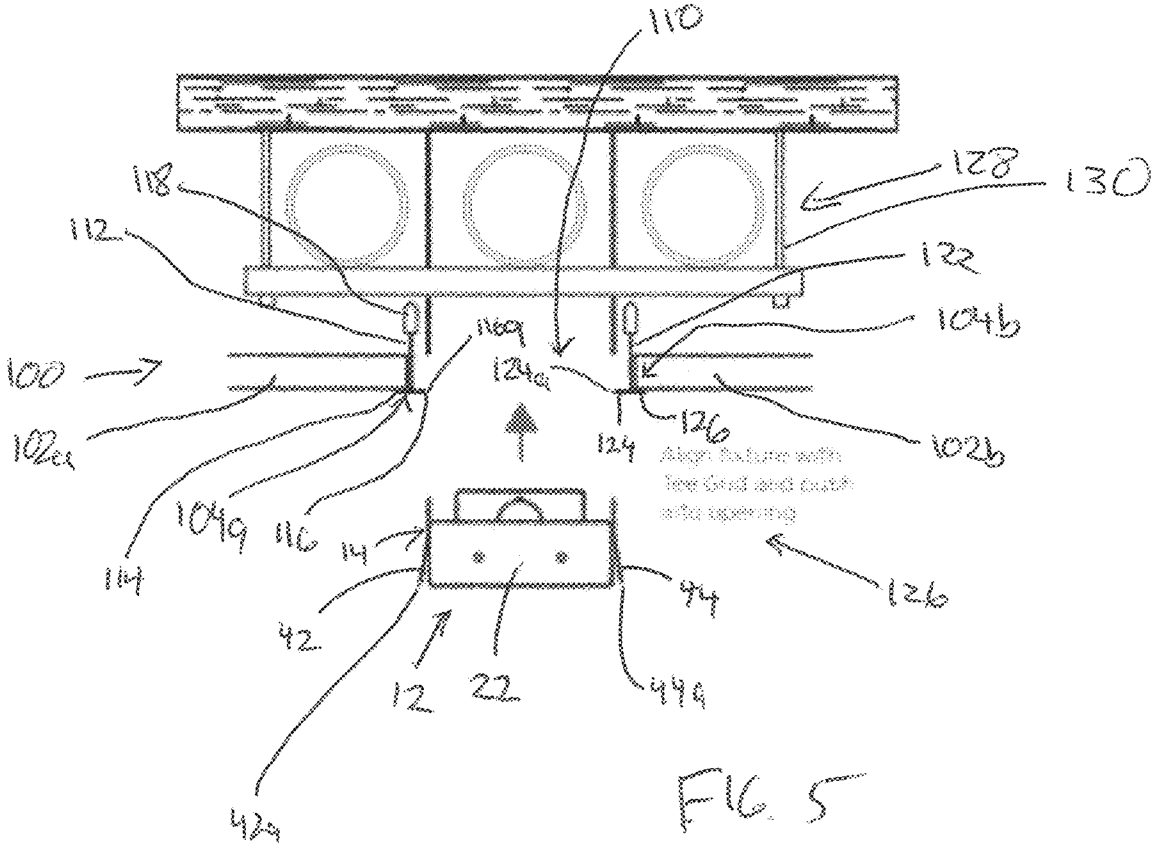
FIG. 5 shows an end plan view of the LED light fixture assembly of FIG. 1 during an installation process according to an embodiment.
Figure 6:
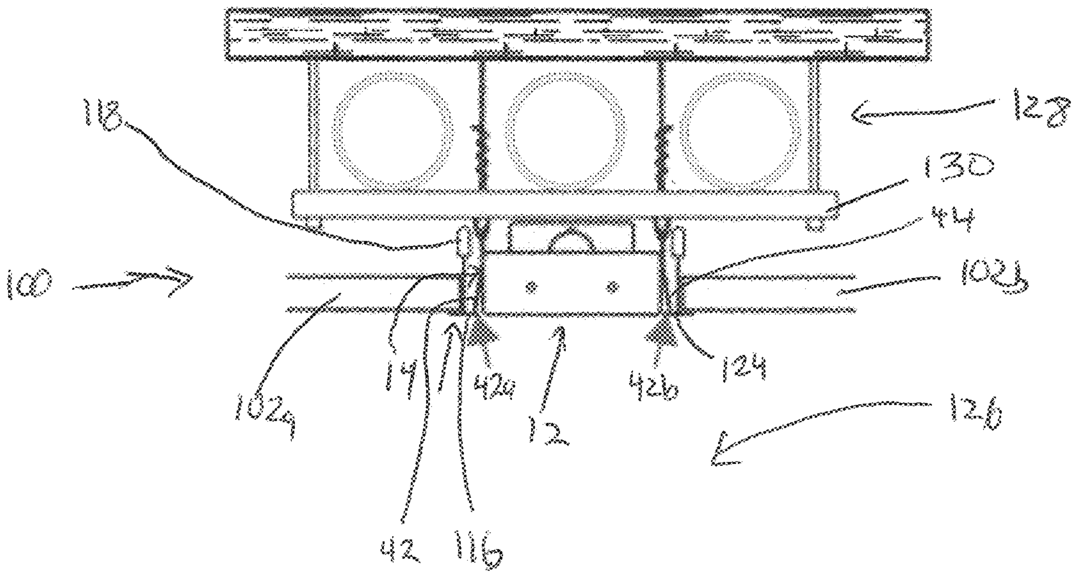
FIG. 6 shows an end plan view of the LED light fixture assembly 10 after installation into the ceiling.

The installation brackets 14 on the lighting fixture enable a more convenient and efficient method of installing a lighting fixture in a ceiling grid, particularly a ceiling grid with a plenum that is either small, or obstructed. FIGS. 2, 5 and 6 illustrate an exemplary method of installing a lighting fixture using the brackets 14. As discussed above, FIG. 2 shows a bottom perspective fragmentary view of the lighting fixture 10 within the context of a ceiling 100 in which it is to be installed. FIG. 5 shows an end plan view of the lighting fixture 10 prior to installation into the ceiling 100, and FIG. 6 shows an end plan view of the lighting fixture 10 after installation into the ceiling 100.

Referring to FIGS. 2, 5, and 6 contemporaneously, the ceiling 100 includes a plurality of drop ceiling tiles 102 disposed on a grid 101 of main tees and cross tees referred to herein interchangeably and collectively as tee grids 104. The grid has been configured to include a pair of parallel tee grids 104*a*, 104*b* configured spaced to defined an opening 110 having a width $w_3$ slightly wider than $w_1$ and slightly narrower than $w_2$, and a length slightly longer than ii. The opening 110 may otherwise be surrounded by ceiling tiles 102 resting on portions of the tee grids 104*a*, 104*b* and other tee grids 104 of the grid 101.

Referring to FIG. 5, as known in the art, and discussed above, the tee grid 104*a* has an inverted T-shaped cross-section, defined by a flat plastic or metal beam 112 having bottom shelves or flanges 114, 116 that extend perpendicular to the beam 112. The bottom shelves or flanges 114, 116 comprise thin flat structures. An upper portion 118 of the tee grid 104*a* may be thicker than the main beam 112, as is known in the art. The tee grid 104*b* has an identical structure, having a main beam 122 and perpendicular flanges 124, 126. A first ceiling tile 102*a* engages and rests upon the flange 114 of the tee grid 104*a*, and a second ceiling tile 102*b* engages and rests upon the flange 126 of the tee grid 104*b*. The furthest inward extent or edge 116*a* of flange 116 and the furthest inward extent or edge 124*a* of the flange 124 define the width $w_3$ of the opening 110.

Referring again generally to FIGS. 2, 5, and 6, the room or space 126 to be illuminated by the light fixture 10 is generally below the ceiling tiles 102, 102*a*, 102*b* and grid 101, and the plenum 128 is above the ceiling tiles 102, 102*a* and 102*b*. In many cases, there can be other structures that form obstructions in the plenum 128. In the exemplary installation environment illustrated in FIGS. 5 and 6, a conduit structure 130 is disposed directly above the opening 110, which would make it difficult to install a light fixture from above the grid 101. However, the embodiments described herein facilitate installation into the obstructed plenum space.

To this end, before installation, the installation brackets 14 are affixed to the top 38 to the light housing 12. This may occur before the lighting fixture 10 is provided to the location of installation, or may be carried out at the location of installation.

As shown in FIG. 2, with additional reference to FIG. 1, when the installation brackets 14 are installed, a cable whip 132 for providing power is coupled to a corresponding connector on the driver housing box 30. The cable whip 132 is a conduit that carries electrical power conductors to connect the driver housing box 30 to the building's electrical system, not shown. The light housing 12 is then aligned with the opening 110, as shown in FIGS. 2 and 5, with the bottom lens 34 facing downward.

Thereafter, the light housing 12 is inserted upward through the opening 110 between the grid tees 104*a*, 104*b*. Because the lowest points 42*a*, 44*a* of the respective arms define a width W2 that exceeds the width W3 of the opening 110, the first arm 42 will engage the edge 116*a* of the shelf 116 and the second arm 44 will engage the edge 124*a* of the shelf 124 as the light housing 12 is advanced upward through the opening 110. This engagement causes elastic deformation of the first arm 42, the second arm 44, and/or either or both of the grid tees 104*a*, 104*b* to allow the arms 42, 44 to pass through the opening 110. The flared shape of the arms 42, 44 enable the gradually increasing deformation as the insertion progress.

Once the lowest points 42*a*, 44*a* of the respective first and second arms 42, 44 clear the edges 116*a*, 124*a* of the shelves 116, 124, the original shape of the first arm 42, the second arm 44, and/or either or both of the grid tees 104*a*, 104*b* returns via elastic spring action. As such, the lowest points 42*a*, 44*a* of the respective first and second arms 42, 44 engage and rest on the respective shelves 116, 124 of the respective tee grids 104*a*, 104*b*, as shown in FIG. 6. FIG. 6 shows the light housing 12 installed, with the first and second arms 42, 44 engaging and resting on the respective tee grids 104*a*, 104*b*.

Preferably, when the first and second arms 42, 44 are supported by tee grids 104*a*, 104*b*, the bottom lens 34 of the lighting fixture 10 is substantially flush with the bottoms of the ceiling tiles 102 and/or the tee grids 104.

It will be appreciated that the above describe embodiments are merely exemplary, and that those of ordinary skill in the art may readily devise their own implementations and modifications that incorporate the principles of the present invention and fall within the spirit and scope thereof. For example, flared arms of the installation bracket can take other forms, and the installation bracket can have multiple flared arms on each side of the light housing. Other variations will be readily apparent to those of ordinary skill in the art.

The invention claimed is:

1. An LED light fixture assembly, comprising:

an LED light housing having a first side configured to convey light from an interior of the light housing to an exterior of the light housing, the first side having a first width in a first plane, the first side defining a bottom side of the LED light housing when installed in a ceiling;

an installation bracket coupled to a second side of the housing, the installation bracket including a first arm extending from adjacent the second side downward and outward from the LED light housing, at least a portion of the first arm flaring downward and outward from the LED housing and configured to flex inward toward the housing, the installation bracket including a second arm extending from adjacent the second side downward and outward from the second side, and wherein a distance between a first point on the first arm intersecting a second plane that is parallel to the first plane and a second point on the second arm intersecting the second plane is greater than the first width.

2. The LED lighting assembly of claim 1, wherein the installation bracket has a cross plate extending from the first arm to the second arm, and wherein the cross plate is coupled to the second side.

3. The LED lighting assembly of claim 2, wherein the cross plate includes at least a first opening configured to receive a fastener therethrough to couple the cross plate to the second side.

4. The LED lighting assembly of claim 3, wherein the cross plate extends in a substantially planar manner from the first arm to the second arm.

5. The LED lighting assembly of claim 4, further comprising at least one tab extending upward from the cross plate, the at least one tab including a throughhole configured to receive a tie wire.

6. The LED lighting assembly of claim 2, further comprising at least one tab extending upward from the cross plate, the at least one tab including a throughhole configured to receive a tie wire.

7. A method of installing a lighting fixture in a ceiling grid, the ceiling grid including tees comprising cross tees and main tees, the method comprising:

inserting the lighting fixture housing through an opening between first and second parallel tees of the ceiling grid, the opening having a first width, the lighting fixture including a light housing and an installation bracket, the light housing having a first side configured to convey light from an interior of the light housing to an exterior of the light housing, the first side defining a bottom side of the LED light housing when installed in a ceiling, the installation bracket coupled to a second side of the housing, the installation bracket including first arm extending from adjacent the second side downward and outward from the LED light housing, the installation bracket including a second arm extending from adjacent the second side downward and outward from the second side;

elastically deforming at least one of the first arm, the second arm, the first tee and the second tee during installation of the lighting fixture housing through the opening; and resting a bottom edge of first arm on the first tee and resting a bottom edge of the second arm on the second tee.

8. The method of claim 7, wherein the installation bracket has a cross plate extending from the first arm to the second arm, and wherein the cross plate is coupled to the second side.

9. The method of claim 8, wherein the cross plate includes at least a first opening configured to receive a fastener therethrough to couple the cross plate to the second surface.

10. The method of claim 9, further comprising attaching at least one tie wire to at least one tab extending upward from the cross plate.

11. The method of claim 10, further comprising attaching a whip cable to the light fixture.

12. An LED light fixture assembly, comprising:

an LED light housing having a first side configured to convey light from an interior of the light housing to an exterior of the light housing, the first side defining a bottom side of the LED light housing when installed in a ceiling, the bottom side having a first width;

an installation bracket coupled to the LED light housing, the installation bracket including a first arm that includes at least a portion flaring out from and extending downward from a first location of the LED light housing, the installation bracket including a second arm;

wherein at least the first arm is elastically deformable to facilitate insertion of the installation bracket coupled to the LED light housing into an opening having a width that is less than a width between a first point on the first arm and a second point on the second arm on a same horizontal plane.

13. The LED light fixture of claim 12, wherein the second arm includes at least a portion flaring out from and extending downward from a second location of the LED light housing.

14. The LED light fixture of claim 12, wherein a lowermost point on the first arm is laterally spaced apart from the LED light housing.

15. An LED light fixture assembly, comprising:

an LED light housing having a first side configured to convey light from an interior of the light housing to an exterior of the light housing, the first side defining a bottom side of the LED light housing when installed in a ceiling, the bottom side having a first width;

an installation bracket coupled to the LED light housing, the installation bracket including a first arm that includes at least a portion flaring out from and extending downward from a first location of the LED light housing, the installation bracket including a second arm;

wherein at least the first arm is elastically deformable to facilitate insertion into an opening having a width that is less than a width between a first point on the first arm and a second point on the second arm on a same horizontal plane, wherein the installation bracket has a cross plate extending from the first arm to the second arm, and wherein the cross plate is coupled to the LED light housing.

16. The LED lighting assembly of claim 15, wherein the cross plate includes at least a first opening configured to receive a fastener therethrough to couple the cross plate to the LED light housing.

17. The LED lighting assembly of claim 16, wherein the cross plate extends in a substantially planar manner from the first arm to the second arm.

18. The LED lighting assembly of claim 15, further comprising at least one tab extending upward from the cross plate, the at least one tab including a throughhole configured to receive a tie wire.

19. The LED light fixture of claim 12, wherein the at least the first arm is elastically deformable to facilitate insertion of the installation bracket coupled to the LED light housing into the opening having the width that is less than the width between the first point on the first arm and the second point on the second arm on the same horizontal plane, and wherein the width of the opening is greater than a third point on the first arm and a fourth point on the second arm in a different horizontal plane.

20. The LED lighting assembly of claim 12, wherein the installation bracket has a cross plate extending from the first arm to the second arm, and wherein the cross plate is coupled to the LED light housing, and wherein the cross plate includes at least a first opening configured to receive a fastener therethrough to couple the cross plate to the LED light housing.

* * * * *